Aug. 24, 1926.
G. W. GALLOWAY
SAFETY TRUCK
Filed Feb. 9, 1926
1,597,592
2 Sheets-Sheet 1
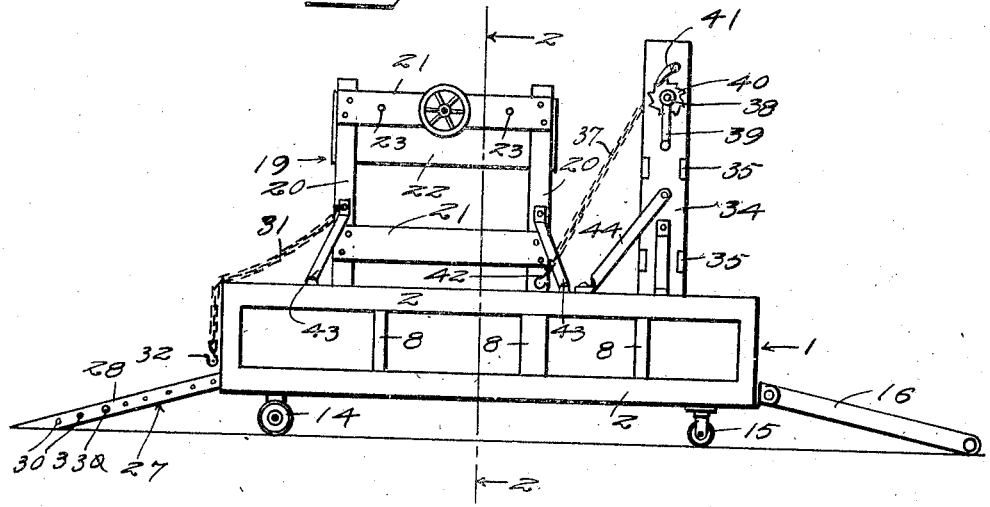
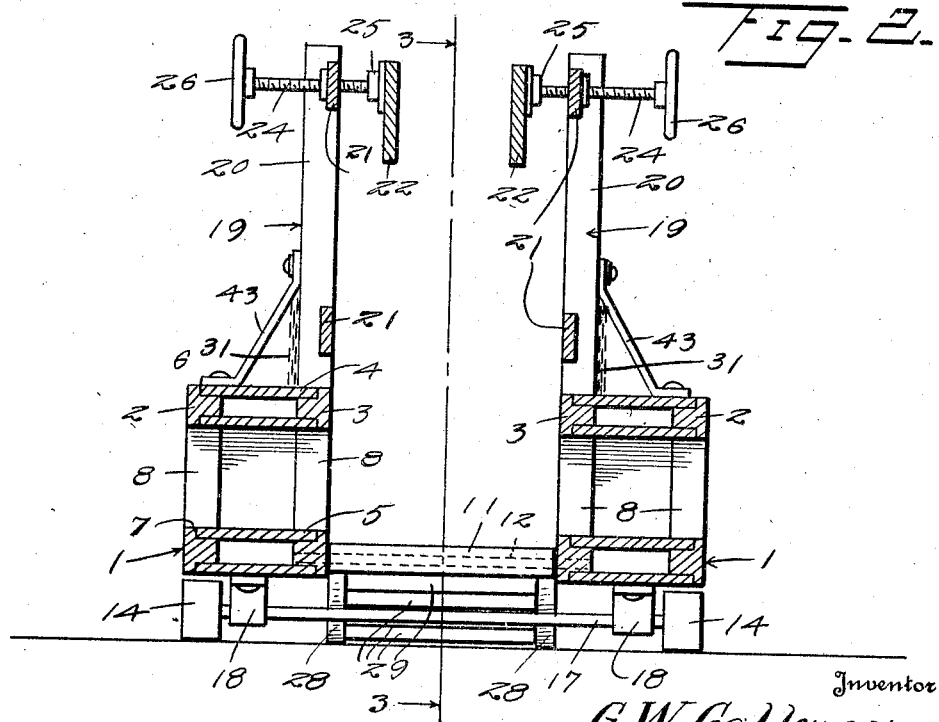
Inventor
G. W. Galloway

Aug. 24, 1926.
G. W. GALLOWAY
1,597,592
SAFETY TRUCK
Filed Feb. 9, 1926    2 Sheets-Sheet 2
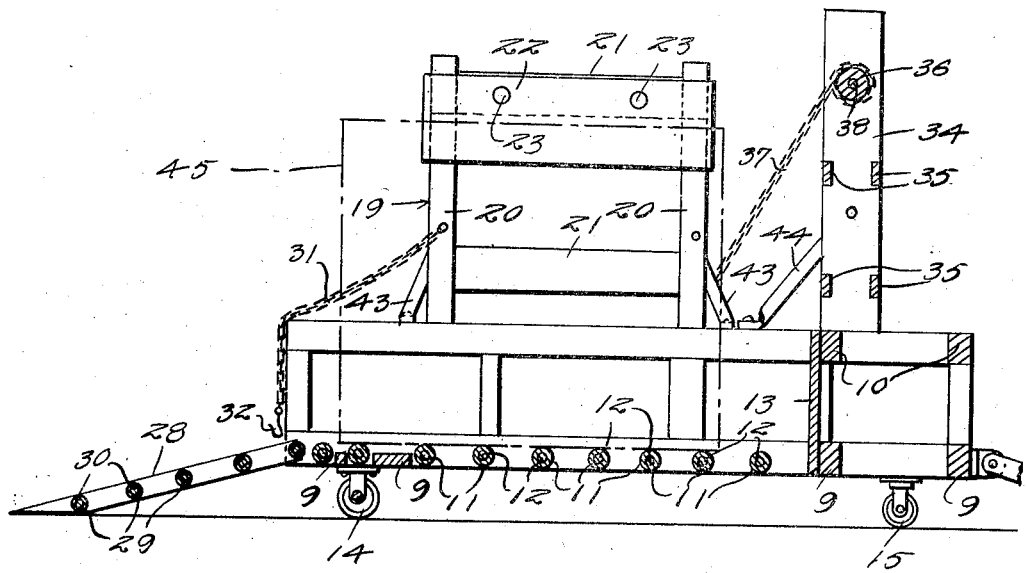
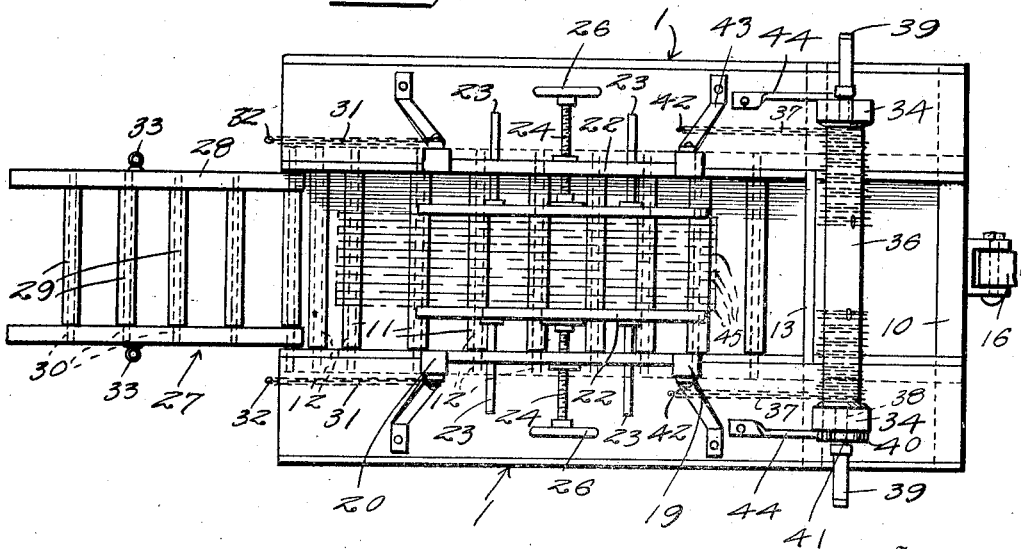
Inventor
G. W. Galloway
By
Attorney Patented Aug. 24, 1926.

1,597,592

UNITED STATES PATENT OFFICE.

GEORGE W. GALLOWAY, OF ROANOKE, VIRGINIA.

SAFETY TRUCK.

Application filed February 9, 1926. Serial No. 87,086.

This invention relates to a novel truck especially adapted for carrying large plate glass panels and thin marble slabs, and has for one of its objects the provision of a strong, durable and highly efficient device of this character which shall include means for holding the panels or slabs against casual movement with respect thereto and means through the medium of which the panels or slabs can be easily moved onto and off of the truck without damage.

With the foregoing and other objects in view, the invention consists of the construction, combination and arrangement of parts hereinafter fully described and claimed, and illustrated in the accompanying drawings, wherein:

Figure 1 is a view in side elevation of a truck constructed in accordance with my invention, Figure 2 is a transverse sectional view taken on the plane indicated by the line 2—2 of Figure 1, Figure 3 is a longitudinal sectional view taken on the plane indicated by the line 3—3 of Figure 2, and Figure 4 is a top plan view of the truck.

Corresponding and like parts are referred to in the following description, and designated in the several views of the accompanying drawings, by similar reference characters.

The body of the truck comprises sides 1 which are of substantially skeleton formation and each of which is made up of an outer frame 2, inner frame 3, top planks 4 and bottom planks 5. The top bars of the frames 2 and 3 are recessed as at 6 for the reception of the side edges of the planks 4 and the bottom bars of the frames are recessed as at 7 for the reception of the side edges of the planks 5. The frames 2 and 3 are reenforced by vertical pieces 8 which are positioned between the top and bottom bars thereof. The sides 1 are secured together by bottom cross pieces 9 and top cross pieces 10, the latter being located in the front ends of the sides. Rollers 11 are supported by shafts 12 and constitute the bottom of the truck body. The rollers 11 are positioned between the bottom bars of the inner frames 3 and the shafts are secured to said bars. The front end of the truck body is closed by a board 13 and the rear end thereof is fully open.

The truck body is supported by rear wheels 14 and front caster wheels 15, and pivoted to the front end thereof is a hand bar 16. The rear wheels 14 are carried by an axle 17 which is journaled in bearings 18 secured to the under faces of the sides 1. The front caster wheels 15 may be of any well known or appropriate construction and are secured to the under faces of the sides 1.

Supports 19 comprising vertical bars 20 and horizontal bars 21, extend upwardly from the sides 1 and have their inner faces arranged in vertical alinement with the corresponding faces of the sides. Clamp boards 22 located at the inner sides of the supports 19, are connected to the supports for adjustment toward and away from each other by rods 23. The clamp boards 22 extend longitudinally of the truck body, and the rods 23 are secured to the boards and slidably connected to the supports 19. Screws 24 have threaded engagement with the supports 19 and are swivelly connected as at 25 to the clamp boards 22. The screws 24 provide means by which the clamp boards 22 may be moved toward and from each other and are provided with hand wheels 26.

To permit the glass panels or marble slabs to be easily moved onto and off of the truck, there is provided a skid 27 which is pivoted to the rear end of the truck body and comprises side bars 28 and rollers 29. The rollers 29 are mounted on shafts 30 which are secured to the skid bars 28 and serve to connect these parts together. Chains 31 secured to the supports 19 provide means by which the skid 27 may be supported in an upwardly inclined position when not in use, and the chains are provided with hooks 32 adapted to be engaged with eyes 33 carried by the skid when it is desired to support it in said position. Uprights 34 are secured to the sides 1 and are connected by cross pieces 35. These parts are located in advance of the supports 19 and constitute the support for a drum 36 which extends transversely of the truck and to which are secured chains 37. The drum 36 is fixed to a shaft 38 which is journaled in the uprights 34 and to the ends of which are secured hand cranks 39. A ratchet wheel 40 fixed to the shaft 38 and a pawl 41 fixed to one of the uprights 34 provide means for holding the drum 36 against casual rotation in one direction. The drum 36 and chains 37 provide means through the medium of which the glass panels or marble slabs can be drawn up the chute 27 into the body of the truck, and to permit the chains to be connected together at the rear edges of the glass panels or marble slabs, the free ends of the chains are provided with hooks 42. Braces 43 are provided for the supports 19 and braces 44 for the uprights 34.

In practice, when it is desired to load the glass panels or marble slabs onto the truck, the skid 27 is first lowered. The glass panels or marble slabs are then raised at their front ends to permit their lower edges to be placed upon the lowermost roller 29 of the skid 27. The chains 37 are then unwound from the drum 36 and connected by means of the hooks 42 at the rear ends of the glass panels or marble slabs. By now rotating the drums 36 so as to wind thereon the chains 37, the glass panels or marble slabs will be drawn upon the skid 27 onto the rollers 11 which constitute the floor or bottom of the truck body. The continued rotation of the drum 36 will draw the glass panels or marble slabs over the floor or bottom of the truck body in a forward direction between the clamp boards 22. The glass panels or marble slabs now occupy the position indicated by dotted lines in Figures 3 and 4, in which figures the panels or slabs are designated 45. The screws 24 are now turned up to move the clamp boards 22 and the glass panels or marble slabs 45 in the direction of each other so as to prevent the panels or slabs from having any movement with respect to the truck. After the glass panels or marble slabs 45 have been thus secured to the truck, the skid 27 is raised and secured in such position by the chains 31.

From the foregoing and accompanying drawings, it will be seen that glass panels and marble slabs may be loaded onto and unloaded from the truck in an easy and quick manner and without damage, and that since the glass panels and marble slabs are secured against movement with respect to the truck there is no danger of their being injured while the truck is in motion.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

1. A truck comprising sides, each consisting of inner and outer frames and planks secured to the top and bottom bars of the frames, shafts carried by the bottom bars of the inner frames, and rollers carried by the shafts.

2. A truck comprising a body, relatively spaced supports extending upwardly from the body, rods slidably carried by the supports, clamp boards located between the supports and carried by the rods, and screws threadedly engaged with the supports and swivelly connected to the clamp boards.

In testimony whereof I affix my signature.

GEORGE W. GALLOWAY.